United States Patent [19]

Troffkin et al.

[11] Patent Number: 5,240,655
[45] Date of Patent: Aug. 31, 1993

[54] PROCESS OF MAKING A BATTERY SEPARATOR

[75] Inventors: Howard J. Troffkin, Potomac, Md.; Burton M. Rein, Mountain Lakes, N.J.; Robert M. Spotnitz, Catonsville, Md.; Richard T. Giovannoni, Columbia, Md.; Yihong Guo, Columbia, Md.

[73] Assignee: W. R. Grace & Co.-Conn., New York, N.Y.

[21] Appl. No.: 808,592

[22] Filed: Dec. 20, 1991

[51] Int. Cl.⁵ .................. B29C 47/06; B29C 67/20; B32B 31/00
[52] U.S. Cl. .................................. 264/28; 264/41; 264/154; 264/171; 264/209.3; 264/210.2; 264/235.6; 264/564; 429/254
[58] Field of Search ............. 264/28, 41, 49, 154, 264/171, 209.1, 209.3, 210.2, 210.6, 211, 235.6, 564; 429/254

[56] References Cited

U.S. PATENT DOCUMENTS 4,650,730  3/1987  Lundquist et al. ............ 429/62

Primary Examiner—Leo B. Tentoni
Attorney, Agent, or Firm—Howard J. Troffkin

[57] ABSTRACT

A process of having a microporous multiply sheet product which is capable of becoming non-porous at a predetermined elevated transformation temperature is formed by first forming a non-porous, multiply initial sheet product having at least one first ply and at least one second ply, each with its own viscosity profile. The initial sheet product is then stretched and annealed to impart porosity to the sheet product.

6 Claims, No Drawings

PROCESS OF MAKING A BATTERY SEPARATOR

BACKGROUND OF THE INVENTION

The subject invention is directed to sheet products which are useful as separators in batteries, in particular, separators in lithium batteries to prevent the occurrence of overheating and thermal-runaway.

Storage batteries have at least one pair of electrodes of opposite polarity and, generally, have a series of adjacent electrodes of alternating polarity. The current flow between these electrodes is maintained by an electrolyte which can be acid, alkaline or substantially neutral depending on the nature of the battery system. Separators are located in the batteries between adjacent electrodes of opposite polarity to prevent direct contact between the oppositely charged electrode plates while freely permitting electrolytic conduction. The separator is normally in the form of a thin sheet or film or in certain designs can be in the form of an envelope surrounding each electrode plate of one polarity. It is generally agreed that separators should be (a) thin and light weight to aid in providing a battery of high energy density, (b) resistant to degradation and instability with respect to the battery components with which it is in contact, (c) capable of exhibiting a high degree of electrolytic conductivity (low electrolytic resistance) and (d) capable, where appropriate, of inhibiting formation and growth of dendrites in battery systems.

Lithium batteries have distinct advantages over other storage batteries. These batteries are capable of providing much higher power storage densities than other types of batteries, excellent shelf life, high energy density (power capability per unit weight) due to the low atomic weight of lithium metal, and high potential for forming a battery in conjunction with positive electrodes far removed from the lithium electrode in electromotive series. The battery can be formed in any conventional physical design:-cylindrical, rectangular or disc-shaped "button" cells, and are normally of a closed cell configuration. Such batteries are generally composed of a negative lithium electrode, a positive electrode and a non-aqueous electrolyte. The negative electrode is conventionally lithium metal or its alloy on a support, such as a nickel coated screen. Positive electrodes of various types have been suggested, including metal oxides, such as manganese dioxide or transition metal sulfides such as sulfides of cobalt, nickel, copper, titanium, vanadium, chromium, cerium and iron. These may be used singly or as mixtures and may further contain other metal ions, such as alkali metal ions. The positive electrode may further contain carbon and a current collector. The electrolyte is formed of a non-aqueous solvent containing a lithium salt. For example, solvents may be acetonitrile, tetrahydrofuran, propylene carbonate, and various sulfones. The lithium salts may be lithium perchlorate, iodide or hexafluroarsenate and the like. An additional, normally passive, component of the battery is a separator membrane located between plates of opposite polarity to prevent contact between such plates while permitting electrolytic conduction.

Separators conventionally used in present battery systems are formed of polymeric films which when placed in an electrolyte or electrolyte system, are capable of exhibiting a high degree of conductivity while being stable to the environment presented by the battery. The films may be macroporous or microporous to thus permit transportation of electrolyte. Examples of such separators include polypropylene sheet which has been stretched and annealed to provide microporosity in the sheet. Such sheets, as disclosed in U.S. Pat. Nos. 3,426,754; 3,558,764; 3,679,538; 3,801,404 and 4,994,335, are normally highly oriented and shrink when subject to heat. Other examples are filled polymeric sheets such as those disclosed in U.S. Pat. Nos. 3,351,495 and 4,287,276 in which the electrolyte is capable of passing through the separator through microporous channels and by the wicking of the filler.

Due to the reactivity of lithium, a major problem encountered with these batteries involves overheating of the cell due to improper use of the cell, e.g. placed in inverted position causing plating out of electrolyte onto an anode; contact between electrodes of opposite polarity such as by dendrite formation or shrinkage of separator; formation of high surface spongy lithium which exothermally reacts with the solvent-electrolyte; as well as other known conditions. Such overheating tends to cause thermal runaway and potentially explosive effects as the system continues to act in its defective mode. This must be controlled to provide a battery having commercial acceptability. One method of controlling or preventing thermal runaway is to have the battery casing connected to a sensor which shuts down the electrical system of the apparatus when overheating is detected. This method requires additional electrical circuitry and associated devices and is unable to make early detection of internal cell overheating and preventive effort.

Conventional polymeric films employed as separators lithium batteries are generally not capable of preventing any uncontrolled overheating. Some separator films are inert to heat and, therefore, do not trigger any preventative mechanism. Other presently used separators, such as microporous polyolefins, when subjected to elevated temperatures exhibit dimensional instability and/or degradation permitting contact between large sections of electrodes of opposite polarity which only accelerates the thermal-runaway of a battery.

Recently U.S. Pat. No. 4,650,730 disclosed a sheet product which is useful as a battery separator and has the capability of drastically reducing its porosity at a predetermined elevated temperature. Thus, the separator is capable, upon detection of internal overheating of shutting-down the battery's system by becoming a barrier to the passage of ions between electrodes of opposite polarity. This separator is composed of a sheet product having at least two microporous plies with one ply being a substantially unfilled microporous sheet capable of transforming to a non-porous sheet at a predetermined temperature while the second ply is a highly filled microporous sheet which is substantially stable at that temperature. U.S. Pat. No. 4,650,730 (the teachings of which are expressly incorporated herein by reference) forms its sheet product by methods which include formation of individual sheets, bonding them together and providing either multiple extraction steps or a combination of extraction and processing steps. These multi-step methods provide a disincentive to forming the sheet product as a cost-effective means to provide safety to lithium battery designs.

The present invention is directed to an effective and efficient method of forming a two-ply microporous sheet product capable of having at least one ply of the sheet product transform to a substantially non-porous ply product at a predetermined elevated temperature while retaining the length and breadth dimensions of the product.

SUMMARY OF INVENTION

The present invention is directed to a multiply sheet product composed of at least one first ply and at least one second ply which are, respectively, composed of polymeric compositions having different rheological and to an effective method for forming a multi-ply sheet product useful as a shut-down battery separator. The method comprises coextruding a first and a second polymeric composition into a multi ply non-porous sheet. The first and second composition are each composed of a different polymer having rheological (melt-/viscosity) which differ from each other. Subsequently, porosity is imparted to the non-porous sheet by stretching and annealing the sheet to produce a porous multi-ply sheet.

DETAILED DESCRIPTION

The present invention provides an effective and efficient method for forming a multiply sheet product. The present method requires first forming a multi-ply, non-porous polymeric initial sheet product and then inducing porosity therein, as fully described herein below.

For purposes of clarity, some of the terms used herein and in the appended claims to describe the instant invention are defined below:

A "sheet" is intended to define a structure having large length and breadth dimensions with respect to its thickness and the thickness is less than about 0.025 cm., preferably less than about 0.005 cm.

A "ply" is sheet-like material formed from a substantially uniform polymeric composition and is a component of an initial sheet product and a final sheet product, as defined below.

An "initial sheet product" is a substantially nonporous multi-ply structure having (a) at least one ply composed of a polymeric composition and (b) at least one ply composed of a different polymeric composition from at least one ply (a).

A "sheet product" is a microporous, multiply structure having (a) at least one ply which is microporous, composed of a polymeric composition and capable of transforming to a substantially non-porous ply at a predetermined transformation temperature and (b) at least one ply which is microporous, composed of a different polymeric composition from the at least one ply (a) and capable of maintaining its dimensions at temperatures of from ambient to at least about 10° C., preferably at least about 20° C. greater than the transformation temperature of ply (a); and all plies are bonded together so as to substantially maintain the length and breadth dimension of the sheet product structure.

The term "first", when used, is intended to modify terms to reference them to ply (a) and components forming same of initial sheet product and of sheet product.

The term "second", when used, is intended to modify terms to reference them to a ply (b) and components forming same of initial sheet product and of sheet product.

The term "polymeric composition" refers to a thermoplastic polymer which may contain, substantially uniformly distributed therein, other materials such as plasticizers, antioxidants, dyes, colorants, extractable liquids (in initial sheet) and the like. The polymeric compositions found useful in the present invention are substantially free of solid particulate fillers.

The term "fluidity" is intended to refer to the ability of a polymer composition to flow, that is to have polymer molecules of the composition capable of sliding over one another. The ability will depend upon the polymer's particular configuration, i.e. linear or branched, crystalline or amorphous, degree of crosslink, temperature of the composition and the like. The fluidity can be measured by conventional techniques such as using Standard Load Melt Index of High Load Melt Index tests (ASTM D-1238-57T) modified to be measured at varying temperatures.

The term "viscosity" is intended to refer to the ability of a polymer composition to resist flow. Viscosity is inversely related to fluidity.

A "separator" is a component of a battery, in particular a storage battery, by which the component maintains a separation between adjacent electrode plates of opposite polarity. A separator of the present invention is formed from a sheet product and may be in various configurations such as, flat, ribbed, corrugated sheet product in the form of a membrane or envelope capable of maintaining separation between electrodes.

The present process is capable of providing a microporous, multiply sheet product capable of exhibiting nonporosity of at least one ply thereof a predetermined temperature in an effective and efficient manner. The process entails forming an initial sheet product. The initial sheet product is a multiply structure having at least one first ply composed of a first polymer composition and at least one second ply composed of a second polymer composition.

The sheet products of the present invention utilize first and second polymeric compositions which have different profiles of viscosity and flow with respect to temperature. These properties can be readily determined by known methods, such as by a modified Standard Load Melt Index or High Load Melt Index test, made over a range of temperature, particularly a range of from 80° to 150° C. The viscosity of the composition forming the first ply should be substantially equal to or less than that of the composition of the second ply at all temperatures. It is understood that both the first and second polymer compositions exhibit very high viscosity at low and moderate temperatures where they are solid materials. At these temperatures, (e.g. ambient to about 70° C.) both solid compositions have substantially equal (approach infinite values) viscosities as they do not exhibit any pronounced flow. However, at some predetermined elevated temperatures of from about 80° C. or greater, as directed by the application for the sheet product, the ply formed from the first polymeric composition must be capable of having a sufficient change in viscosity (decrease) or related elasticity to exhibit flow and ability to collapse into its pores. This temperature is the transformation temperature of the first polymer composition. At this transformation temperature, the second polymer composition must maintain sufficient high viscosity and thus retain its elastic energy, i.e. show substantially no flow.

The polymeric compositions useful in forming each ply of the multiply sheet product of the present invention can be selected from known classes of polymers capable of forming a microporous sheet as, for examples, polyolefins; polysulfones, such as polyarylether sulfones and the like; polyvinyl chloride, polyvinyl fluoride, polyvinylidene dichloride polytetrafluoroethylenepropylene copolymers, polyamides, polyphenyleneoxidepolystyrene copolymers, polycarbonates and the like. The polymers used to form the first and second sheets of the multiply sheet product are preferably selected from the same class of polymeric material to best provide the properties described above.

A preferred class of polymers are the polyolefins due to their inertness with respect to the other battery components with which they come in contact. The remainder of this description shall illustrate the present invention by combinations of the preferred embodiment wherein polyolefin compositions are used to form the present sheet materials and separators therefrom. It has been found that when forming a product having at least one first ply of an unfilled microporous polyolefin composition which normally exhibits the undesired properties of shrinkage in length and breath in combination with at least one second polymer of a higher viscosity profile polyolefin composition one unexpectedly attains a product of low transformation temperature while exhibiting and maintaining high dimensional stability. For example, polymers can be selected from polyolefins, such as polyethylene, polypropylene, ethylene-butene copolymers, ethylene hexene copolymers, ethylenemethacrylate copolymers and the like and mixturesd thereof. The preferred polyolefin forming the first ply are polyolefin wax, low density polyethylene, low molecular weight, high density polyethylenes and copolymers of ethylene with other α-olefins (especially $C_4$-$C_{10}$ alpha-olefins). The α-olefin is present in from 5 to 20 weight percent of the copolymer. The polyolefins should have a weight average molecular weight of from 100,000 to about 5,000,000, preferably the first polymer will be a low weight average molecular weight polymer of from about 100,000 to about 1,000,000 and preferably the second polymer would have a higher weight average molecular weight including ultra-high (greater than about 2,000,000) molecular weight polylefin (e.g. polyethylen).

The preferred polymers forming the first ply are polyolefins selected from polyethylene, polypropylene, ethylene-butene copolymers, ethylene-hexene copolymers, ethylene-methacrylate copolymers and the like. The first polymer will be chosen to have a low melting point to provide a nonporous first ply at a desired temperature within the range of from 80° C. to 150° C. and preferably from 80° C. to 120° C. The preferred first polymers have low weight average molecular weight of from 100,000 to 1,000,000.

The preferred polymers forming the second ply are polyolefins selected from polyethylene, polypropylene, ethylene-butene copolymers, ethylene-hexene copolymers, ethylene-methacrylate copolymers and the like. The second polymer will be chosen to have a melting point which is at least 10° C. higher, preferably at least 20° C. higher than the transformation of the first polymer. The second polymer preferably has a weight average molecular weight which is higher than that of the first polymer and is selected from greater than 100,000 to 2,000,000, most preferably 200,000 to 5,000,000.

The first polymer/second polymer combination should be chosen so there is a significant lower temperature-fluidity profile for the first ply with respect to the second ply. For example, suitable combinations are low density polyethylene/high density polyethylene; polyethylene/polypropylene/ narrow molecular weight polyethylene/broad molecular weight polyethylene; ethylene-butene copolymer (5:1 to 20:1)/polyethylene; ethylene-hexene copolymer (5:1 to 20:1)/polyethylene; ethylene-hexene copolymer (5:1 to 20:1)/polypropylene and the like.

Each ply is formed from a polymeric composition comprising a polymer, as described fully herein below and may, in addition, have uniformly distributed therein plasticizers, stabilizers, antioxidants and the like for said polymer. The polymer composition should contain substantially no particulate filler although small amounts of up to about 15 weight percent, preferably less than 10 weight percent may be contained in the compositions.

The initial sheet product is formed by simultaneously extruding at least one sheet of first polymer composition and at least one sheet of second polymer composition together. This process step is preferably conducted by coextruding each of the first and second polymer compositions through a single die where they join together such that they form distinct, well-bonded plies to provide the single initial sheet product. The coextrusion can, for example, be performed using conventional feed block dies where each of the melted polymer compositions are combined in a relatively small cross-section before entering the die itself. The preferred manner of simultaneously forming the multiply initial sheet product is by coextrusion using a multimanifold internal combining die. In such a system, the first and second polymer compositions (as melt feed stock) enter the die separately and joint just before the final die orifice. This system provides for the use of two or more polymer compositions of substantially different flow characteristics while enabling there to be a high degree of ply uniformity and thickness control to produce a thin initial sheet product.

The initial sheet can be formed by blown film technique. The film is initially formed by a coextrusion die having an annular exit port with air or other gas being injected into the center of the initial tube formation to cause expansion of the tube to a prescribed diameter. When the film is cooled it is slit to provide a multiply initial sheet product. This technique is used when it is desired to have an initial sheet of substantial width such as 30 to 40 inches wide. Alternatively, the initial sheet can be formed by sheet extrusion using a slit dye. In this instance, the width of the sheet will be substantially controlled by the slit dimension.

The multiply sheet product of the present invention must be composed of (a) at least one first ply of a predetermined length and breath and of a thickness of less than about 10 mils (0.025 cm) preferably less than 5 mils (0.013 cm) and most preferably from 0.1 to 2 mils. The pores of the sheet must be of sufficient size and amount to permit the resultant sheet product of the present invention to exhibit low electrolytic resistivity i.e. 500 ohm-cm or less depending on the particular application. It is understood that the thinner the sheets dimensions are, the lower the overall volume percent of the sheet needs to be occupied by the pores to sustain the desired low electrolytic resistance. The pores of the first ply will normally have average pore size of from about 0.005 to about 50 microns in diameter and the pores normally occupy at least about 20 volume percent and preferably at least about 40 volume percent of the total volume of the sheet. The first ply is formed of a polymer composition having viscosity/flow properties such that it is capable of transforming to a substantially non-porous sheet at a predetermined transformation temperature is normally from 80° C. to 150° C., preferably from 80° C. to 120° C and when a component of the multiply sheet product. The multiply sheet product must further be composed of (b) at least one second ply of a predetermined length and breath and a thickness of less than 10 mil (0.025 cm), preferably less than 5 mils (0.013 cm) and most preferably from 0.1 to 2 mils (0.00025–0.005 cm) having average pore size of from about 0.005 to about 50 microns in diameter wherein the pores occupy at least about 20 volume percent and preferably at least about 40 volume percent of the sheet's volume. The ply (b) is substantially stable (minor shrinkage of less than 10 percent may occur over conventional battery life and can be accommodated for an initial design) in form and dimensions at temperatures ranging from ambient to at least about 10° C., preferably at least 20° C., greater than the transformation temperature of the polymer composition of ply (a). The present multiply sheet product is capable of maintaining its length and breath dimensions at the sheet product's transformation temperature and beyond.

The transformation temperature of a sheet materials is the temperature at which the sheet, when in a battery cell, exhibits a large increase in electrolytic resistivity to provide resistivity sufficient to substantially shut down a battery system or a portion of such a system (for example one cell or a localized portion to prevent undesired thermal runaway. Electrolytic resistivity of at least about 1500 ohm-cm is normally sufficient to shut down a battery system although greater or lesser resistance may be sufficient for a particular battery or for a particular application. The transformation temperature substantially coincides with the temperature at which the composition of the first ply exhibits sufficient fluidity and ability to collapse into its pores to provide a substantially nonporous sheet while a component of the sheet product.

The first and second plies are each formed from polymeric compositions. The polymer matrix must be selected from polymers which are inert under the conditions encountered in a battery especially with respect to the electrolyte composition. In addition, each polymer composition must be capable of exhibiting microporosity and must also be capable of being formed into a thin sheet of less than 10 mils, preferably less than 5 mils and most preferably less than 2 mils. In addition, each polymer composition is a substantially unfilled composition to enhance its capability to form coextruded sheet product.

The polymeric component of each ply forming the sheet product of the present invention must be chosen in a judicious manner so that the polymeric component of the first ply has a significant lower temperature-fluidity profile than that chosen for the second ply. Secondly, the first and second polymers must be compatible to be capable of having the first and second plys formed therefrom adhere to each other. Thirdly, the first and second polymers must be inert with respect to the battery environment for which the resultant sheet product is intended for use. Fourthly, the second polymer composition must be capable of maintaining its high viscosity-fluidity profile up to at least 10° C., preferably at least 20° C., above the transformation temperature of the first polymer composition used to form a sheet. Thus, although the polymers may be chosen from a number of film-forming polymeric materials, they must meet the above criteria. For example, a high density, narrow molecular weight polyethylene (as first polymer)/high density, broad molecular weight distribution polyethylene (as second polymer) combination; a low density polyethylene/high density polyethylene combination; a polyethylene/polypropylene combination; and the like can be used in forming the initial sheet product. In addition, although the polymer may be a homopolymer, each may be chosen from copolymers as, for example ethylenebutene copolymer/polyethylene; ethylene-hexene copolymer/polyethylene; ethylene-butene copolymer/polypropylene, and the like. The preferred material being the use of copolymers of ethylene-butene or ethylene-hexene copolymers as the first polymer. The choice of first polymer will be dictated by the particular transition temperature of the sheet product. Where low transition temperature (80° C.–110° C.) sheet product is desired, the first polymer can be chosen from copolymers of ethylene-butene or ethylene-hexene having narrow molecular weight distribution. The preferred second polymer is selected from high density polyethylene or predominantly isotactic ( 80%) isotactic.

The first polymer and the second polymer are the major component used to form a first ply and a second ply, respectively, of a sheet product. The first and second polymers must be selected from polymers having different profiles of viscosity and flow with respect to temperature. It is desirable that the transition temperature (temperature at which the polymer exhibits high flow) of the first polymer composition be at least 10° C. and preferably at least 20° C. below that of the second polymer.

As stated above, the first and second polymeric compositions may each contain stabilizers, antioxidants, nucleating agents, additives and processing aids as known to those skilled in the art. Representative of the stabilizers include 4,4-thiobis (6-tert-buty-m-cresol), 2,6-ditert-butyl-4-methylphenol and the like. Representatives of antioxidants include hydroquinone and the like. Representatives of other additives including carbon black which may have high surface area (1000 $m^2/gm$) and the like. Representatives of processing aids include zinc stearate and the like. The processing aids, stabilizers, antioxidants and the like are used in conventional low amounts such as up to about 2 percent. The carbon black additive may be used in up to about 10 percent by weight.

Each first and second polymeric composition is processed separately by conventional methods such as mixing, grinding, milling and the like to provide substantially homogeneous compositions. The compositions are concurrently fed to the initial sheet forming means such as an extrusion apparatus fitted with a coextrusion head and related feed means. The initial sheet product is formed. This initial sheet product is normally a two-ply product having one first ply and one second ply or a three-ply product having one first ply contained between two second plies.

Each first and second polymeric composition used to form an initial sheet product should be a composition which is suitable for each first and second ply of the final sheet product. Each composition is composed of a polymer having the desired viscosity and flow profile characteristics, as described above, and may also contain small amounts of additives such as stabilizers, antioxidants, wetting agents, colorants and the like. These additives are normally present in up to about 10 weight percent of the total composition. The polymer compositions must be substantially inert with respect to the battery environment for which it is contemplated for use.

Methods have been disclosed to produce single microporous sheets from corresponding single, uniform films by stretching and annealing the film. Such processes are disclosed in U.S. Pat. Nos. 3,426,754; 3,558,764; 3,679,538; 3,801,404; 3,801,692; 3,843,761; and 4,138,459. The teachings of these references are expressly incorporated herein. The gist of the methods disclosed by the above references comprises the steps of subjecting an unstretched film to heat treatment, stretching the film at a temperature close to room temperature or a temperature in the range of between a temperature not lower than the second order transition temperature of the resin (for example, a temperature not lower than −40° C. in the case of polypropylene) and a temperature not higher than the temperature at which the partial melting of the crystalline phase begins to occur. Pores are generated and provide a porous body which is then stretched at a temperature in the range of between a temperature higher than the temperature at which the partial melting of the phase beings to occur and a temperature not higher than the crystalline melting point, and again conducting heat treatment to thermally fix the pores thus formed.

Another stretching process is described in U.S. Pat. Nos. 4,539,256 and 4,726,989 in which the stretching is conducted at elevated temperatures with the aid of a nucleating agent in the sheet.

Still another stretching and annealing process for imparting microporosity to a single, uniform highly crystaline polymer sheet is disclosed in U.S. Pat. No. 4,994,335 the teachings of which are incorporated herein by reference. In this method, the film is stretched under extremely low temperatures of from −198° C. to −70° C. and then subjected to heat fixation at a temperature of from 5° to 60° C. below the melt temperature of the polymer. Alternately, the sheet is stretched at a rate of up to 10% per minute while maintained at a temperature of 10°–60° C. below the polymer's melting point and then subjecting the sheet to heat fixation, as described above.

However, each of the above teachings describe specific methods for imparting porosity to polymer sheets formed from a single polymer and of a one-ply simple sheet having uniform composition across its thickness. In the present invention, the initially formed multiply initial sheet product described above can be made microporous by subjecting the multiply initial sheet product to stretching and annealing, as described above. The temperature ranges used should be based on the polymer having the highest melting point of the first and second polymer compositions used to form the initial sheet product. However, the temperature of stretching and of annealing shall not be above 20° C. below the transformation temperature of the first polymer composition.

The resultant sheet product is a multiply product in which the first ply, although of a lower melting point polymer, will exhibit porosity as it is stretched and annealed along with the second ply's polymer composition.

The resultant sheet products have been found to be capable of exhibiting inhibition to dendrite growth, high conductivity at ambient temperatures, capability to be formed into a very thin sheet products, and stability to the environment produced by and components of the battery. In addition, the present sheet products are dimensionally stable and do not exhibit unacceptable and detrimental shrinkage in its length and breath dimensions when subjected to elevated temperatures. The sheet product, therefore, when used as a separator does not permit contact of electrodes even at temperatures when conventional polyolefin separators would degrade and/or shrink.

The product obtained from the extraction step is a microporous multi-ply polymer sheet product.

The exact final composition of each ply will depend on the original composition. Each ply exhibits microporosity. The size of the pores of the present sheet product have a substantial proportion which are less than of 0.5 micron diameter (Capillary Flow Porometry Method) and are generally tortuous in nature. It has been found that the microporosity can be set in the structure of the final sheet product by subjecting the formed sheet product to uniaxial stretching. The stretching can be accomplished by varying the speed of the take-up roll subsequent to extraction. The stretching should be done at temperatures of from about 25° C. to about 110° C. and preferably from about 40° C. to about 100° C. The stretching should be at a ratio of at least 1:1.05 and preferably from about 1:2 to about 1:4.

The sheet products formed by the present process has the ability to drastically reduce its degree of porosity while maintaining its length and breath upon being subject to a predetermined elevated temperature. The reduced porosity caused a "shut-down" of the battery's electrical system by being a barrier to the passage of ions in the electrolyte between electrodes of opposite polarity. This "shut-down" ability can, in lithium batteries, act as a "safety switch" which in effect, turns off the circuit prior to harm being done through thermal runaway or explosion of the defective battery.

The following example is given for illustrative purposes only and is not meant to be a limitation on the invention described herein and in the claims appended hereto. All parts and percentages given below are by weight unless otherwise stipulated.

EXAMPLE 1

A two ply sheet product is formed by co-extruding a high density polyethylene having a weight average molecular weight of 250,000 and a crystalinity of about 80 percent as one ply and an ethylene-butene (87-13) copolymer having a crystalinity of about 50 percent and a melting point of 110° C. The coextrusion is conducted using a blown film die at a temperature of 170° C. to form a two-ply sheet product.

The resultant nonporous sheet product is stretched by 15 percent in one direction while in contact with liquid nitrogen. While maintaining the stretched state, the sheet product is heated to 90° C. in an air oven for 5 minutes. The sheet is then heated at 80° C. while stretching in the same direction as the initial stretch until stretched to about 150 percent. The sheet product is then annealed at 90° C. for 1 hour.

EXAMPLE 2

The process of Example 1 is repeated except that polypropylene of 65 percent crystalinity is used in place of the polyethylene of Example 1.

The microporous sheet product exhibits the same change in resistivity at 110° C.

EXAMPLE 3

The process of Example 1 is repeated that the polyethylene further contains about 5 wt. percent fume silica as a nucleating agent.

The resultant sheet product exhibits a higher degree of porosity and also exhibits change in resistivity at 110° C.

EXAMPLE 4

A three ply sheet product is formed by coextruding a mixture of 60 wt. % high density polyethylene: 40 wt. % mineral oil (outer layers) and a mixture of 60 wt. % ethylene-butene copolymer: 40 wt. % mineral oil for the middle layer. The coextrusion is conducted using a multimanifold film die at a temperature of 245° C. onto a chill roll at 50° C. The film is extracted using 1,1,1 trichlomethane to remove mineral oil. The three-ply sheet product was then oriented in the machine direction (10:1).

The resultant product is a multiply microporous sheet product which has low resistivity at temperatures of up to 100° C. and high resistivity of greater than 1500 ohm-cm when exposed to 100° C.

What is claimed:

1. A process of forming a microporous multi-ply sheet product comprising
    a) forming a first polymer composition and a second polymer composition; each of said compositions composed of components which are substantially inert with respect to a battery's environment for which said sheet product will be used;
    b) co-extruding an initial sheet product having at least one first ply composed of the first polymer composition and at least one second ply composed of the second polymer composition; wherein each of said first ply and said second ply are bonded together and said first polymer composition exhibits a viscosity profile such that its viscosity is ultra high and substantially the same as that of the second polymer composition at temperatures of up to about 80° C. and has a decrease in viscosity to exhibit flow at a transformation temperature within the range of from about 80° C. to 150° C. while the second polymer composition maintains its ultra high viscosity for at least 10° C. above said transformation temperature;
    c) imparting porosity to the initial sheet by subjecting said initial sheet to stretching and annealing; and
    d) recovering a final sheet product having at least two plies comprising
        1) at least one first ply in the form of a microporous sheet of a predetermined length and breadth and of less than 10 mils thickness and having pores of an average pore size of from about 0.005 to 50 microns in diameter occupying at least about 20 volume percent of said sheet, said sheet composed of a substantially unfilled first polymer composition;
        2) at least one second ply in the form of a microporous sheet of a predetermined length and breadth and of less than 10 mils thickness and having pores of an average pore size of from about 0.005 to 50 microns in diameter occupying at least about 20 volume percent of said sheet, said sheet composed of a substantially unfilled second polymer composition; each of said first and second ply being bonded together to provide a unitary sheet product capable of maintaining its length and breadth dimension.

2. The process of claim 1 wherein the porosity is imparted to the initial sheet product by stretching the initial sheet product at a temperature between the second order transition temperature of the second polymer and the melt temperature of the first polymer and while maintained in a stretched state heat annealing the initial sheet product.

3. The process of claim 1 wherein the porosity is imparted to the initial sheet product by uniaxially stretching the initial sheet product from 1 to 200% based on initial sheet product dimension at a low temperature of from $-198°$ C. to $-70°$ C. and then heating the stretched sheet while maintained in a stretched state to a temperature of from 5° to 60° C. lower than the melt temperature of the first polymer.

4. The process of claim 1 wherein the first and second polymer compositions contain a minor component selected from the group consisting of hydrocarbon oil and solid particulate and the porosity imparting step further comprises, after stretching, the removal of said minor component.

5. The process of claim 1, 2, 3 or 4 wherein the first polymer is a copolymer of ethylene and a $C_4$–$C_{10}$ alpha-olefins.

6. The process of claim 1, 2, 3, or 4 wherein the first polymer is selected from the group consisting of ethylene-butene copolymers, ethylene-hexene copolymers, ethylene methacrylate copolymers and polyethylene and the second polymer is selected from the group consisting of polyethylene and polypropylene.

* * * * *